United States Patent [19]

Melas

[11] 4,417,244
[45] Nov. 22, 1983

[54] AUTOMATIC PATH REARRANGEMENT FOR BLOCKING SWITCHING MATRIX

[75] Inventor: Constantin M. Melas, Los Gatos, Calif.

[73] Assignee: International Business Machines Corp., Armonk, N.Y.

[21] Appl. No.: 298,398

[22] Filed: Sep. 1, 1981

[51] Int. Cl.³ .............................................. H04Q 9/00
[52] U.S. Cl. ........................ 340/825.8; 340/825.03; 179/18 EA; 179/18 GF
[58] Field of Search ........... 340/825.8, 825.79, 825.01, 340/825.02, 825.03; 370/16, 64, 63, 95; 179/18 EA, 18 GF; 455/54

[56] References Cited

U.S. PATENT DOCUMENTS

| | | | |
|---|---|---|---|
| 3,916,124 | 10/1975 | Joel, Jr. ............................ | 179/18 EA |
| 3,962,552 | 6/1976 | Reines et al. .................... | 179/18 EA |
| 3,988,543 | 10/1976 | Dall'Olio ............................. | 370/95 |
| 4,012,597 | 3/1977 | Lynk, Jr. et al. ...................... | 455/54 |
| 4,022,982 | 5/1977 | Hemdal ............................ | 179/18 EA |
| 4,160,127 | 7/1979 | Slana et al. ............................. | 370/16 |
| 4,245,214 | 1/1981 | Beirne ............................. | 179/18 GF |
| 4,355,384 | 10/1982 | Genter et al. ......................... | 370/64 |

FOREIGN PATENT DOCUMENTS 53-115111 10/1978 Japan ...................................... 370/59

*Primary Examiner*—Donald J. Yusko
*Attorney, Agent, or Firm*—Joscelyn G. Cockburn

[57] ABSTRACT

A method for rearranging a three stage (primary, intermediate, tertiary) switching network to permit data or digitized voice signals to be transmitted from any given primary outlet to any given tertiary inlet. The intermediate stage has fewer inlets than the number of primary stage outlets and fewer outlets than the number of tertiary stage inlets, making the network a conditionally blocking one. Two call rearranging buses are provided to assure that each signal path being rearranged is maintained to prevent data transmission dropout. Primary to intermediate and intermediate to tertiary paths are rearranged one at a time using the call rearranging buses to move free primary and tertiary links to a single intermediate matrix.

4 Claims, 14 Drawing Figures

| ENTRY# | PRTABL BYTE 1 | BYTE 2 | BYTE 3 |
|---|---|---|---|
| 0 | $M_1(a)$ | | |
| 1 | $M_2(b)$ | | |
| 2 | $M_2(x)$ | | |
| 3 | $M_1(y)$ | | |
| ⋮ | $M_1(c)$ | | |
|   | $M_2(d)$ | | |
|   | $M_2(z)$ | | |

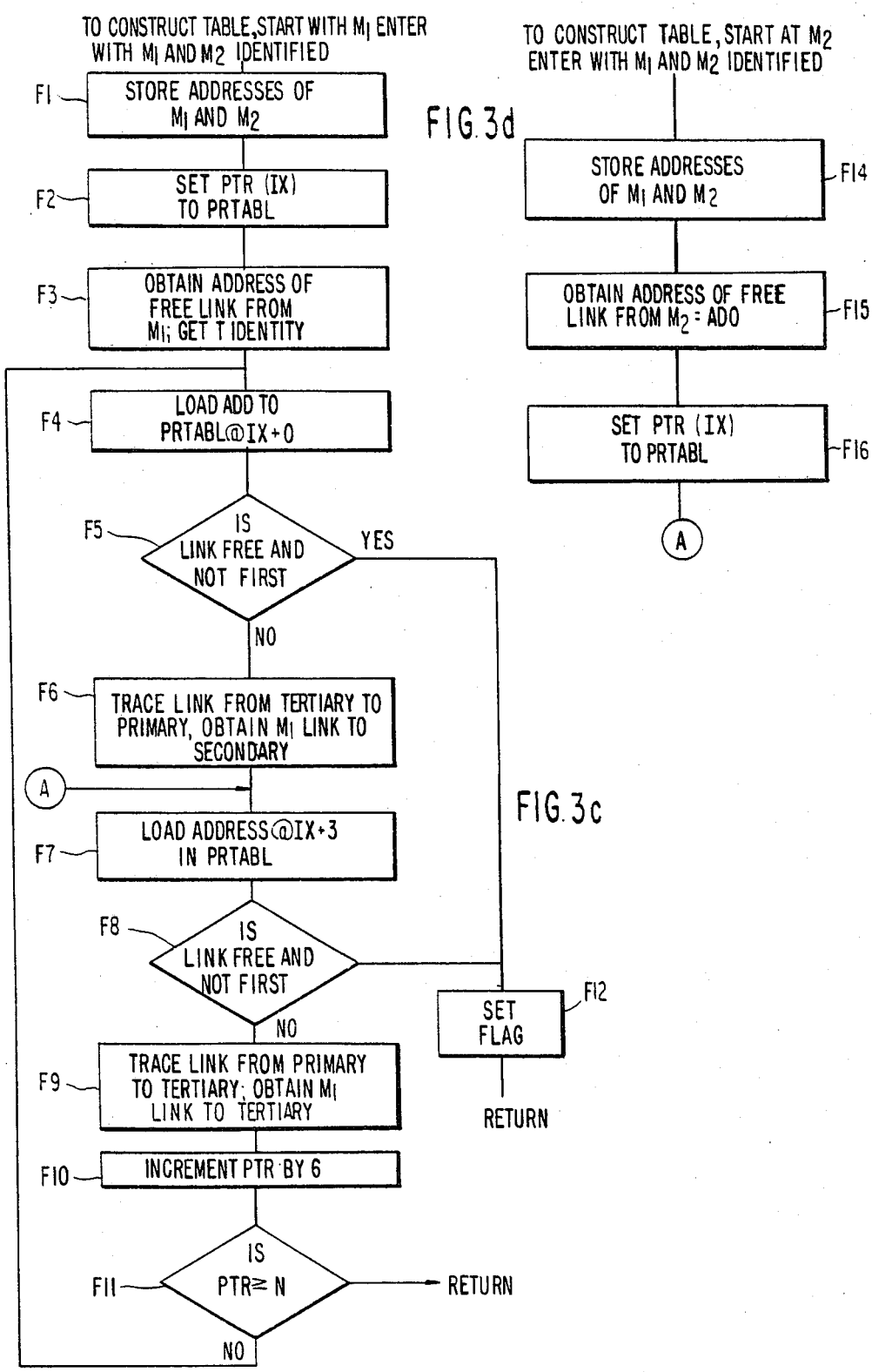

AUTOMATIC PATH REARRANGEMENT FOR BLOCKING SWITCHING MATRIX

DESCRIPTION

1. Technical Field

The invention relates to a method of operating a switching network, and more particularly a method of rearranging paths in an otherwise blocking switching network.

2. Background Art

In the art of constructing and operating switching networks, a non-blocking switching network is defined as a network in which the capacity is always present to interconnect any free inlet to any free outlet regardless of the existing traffic pattern in the network. As a consequence of this characteristic, as is also known to the art, a non-blocking switching network with a fixed number of inlets and outlets requires a minimum number of cross points. Since the number of cross points required in the switching network is indicative of the cost of that network, there has been a desire to decrease the number of cross points without at the same time changing the number of inlets and outlets. While such switching networks have been designed, they are not non-blocking, i.e. they are blocking networks. For such a network, there may be traffic patterns in which a free inlet cannot be connected to a free outlet because of the particular traffic pattern or cross points used.

One technique known to the art for reducing the complexity (number of cross-points) of switching networks is to provide for the switching action to occur across a number of stages greater than two. Each stage may consist of a plurality of identical switching matrices. For example, a three-stage switching network has primary, intermediate and tertiary stages. To illustrate the reduction in complexity in a blocking switching network as compared to a non-blocking network, consider a switching network for connecting 1024 inlets to a similar number of outlets. A non-blocking switching network with these parameters has 128 primary and tertiary matrices, each with 16 inlets and 31 outlets, and 31 intermediate matrices each with 64 inlets and 64 outlets, each of the intermediate matrices can actually comprise 4 matrices each with 32 inlets and 32 outlets. Using commercially available integrated circuitry, the network then consists of 252 separate chips, i.e. one chip per matrix. On the other hand, one design for a blocking network to handle the same number of inlets and outlets requires 64 primary and tertiary matrices, each of 32 inlets and 32 outlets, and 32 intermediate matrices, each with 32 inlets and 32 outlets, for a total of 96 chips, i.e. about 40% of the hardware required for the non-blocking switching network. The use of a significantly smaller number of intermediate stage matrices (32, 32 inlet, 32 outlet matrices rather than 124 such matrices) is not obtained without a penalty. The penalty is of course that the blocking network may not be capable of connecting a free inlet to a free outlet. Such a condition can arise if there is no middle (intermediate stage) matrix with a free link to a desired primary, and at the same time a free link to a desired tertiary. That is not to say sufficient free links are not available, but they are not connected to the same intermediate matrix. Because the primaries and tertiaries have as many inlets and outlets, there is at least one middle matrix with a free link to any primary or tertiary, unless network capacity is reached. To overcome this condition, rearranging connections or paths is desirable to free up links between primary, intermediate and tertiary stages so that one intermediate matrix has a free link to the desired primary and a free link to the desired tertiary.

The prior art has examined operating with blocking networks (and rearranging), see for example Benes, U.S. Pat. No. 3,358,269; Opferman et al., U.S. Pat. No. 3,638,193 and Koenig, U.S. Pat. No. 4,075,608. While each of these patents discuss rearranging connections in a switching network, none of them describe a machine-implementable method or procedure for effecting such rearrangement. Furthermore, the Opferman et al disclosure is limited to switching networks employing reversing switch (beta) elements.

It is therefore one object of the present invntion to provide a method of rearranging paths in an otherwise blocking switching network so that otherwise blocked paths (or connections) can be made.

It is another object of the present invention to provide such a method of rearrangement which can be used both for digitized voice as well as data.

A significant difference exists between the handling of digitized voice, and other digital data, primarily as a result of the end use for which the information is destined. Digitized voice, since it is ultimately for understanding by a human being, is relatively tolerant of switching effects, especially those which are relatively short, e.g. millisecond or shorter disturbances. As a result, a rearranging method for digitized voice can be implemented even though paths are broken and not reconnected for periods which are of millisecond duration or less. Signals such as digitized voice are tolerant of such switching disturbances since the effect they produce is almost unnoticable.

On the other hand, other digital data is not so tolerant of switching disturbances. For example, at a megabit pulse rate breaking a connection for a millisecond can mean the loss of up to 1000 bits. As a result and in connection with a rearranging function, some technique must be used to provide alternate paths for a path which is to be broken, and ensure that the alternate path is available prior to the time that the path is broken. To this end, in accordance with the invention, the switching network includes a plurality (at least two) of call rearranging buses which can be used to provide this alternate path.

Accordingly, it is another object of the present invention to provide a method of path rearranging for a switching network which can handle either digitized voice or other digital data, especially digital data which is not tolerant of switching transients or disturbances.

SUMMARY OF THE INVENTION

These and other objects of the invention are met in accordance with one aspect of the invention comprising:

a method of rearranging paths in a blocking switching network, said blocking switching network comprising at least primary, intermediate and tertiary stages, with at least two intermediate switching matrices in said intermediate stage, each said intermediate switching stage matrix with a number of inlets and outlets less than the total number of inlets of primary stage matrices or the total number of outlets of tertiary stage matrices, comprising the steps of:

(a) detecting a connection request for a path which is blocked;

(b) identifying a first intermediate matrix with an appropriate free primary link and a second intermediate matrix with an appropriate free tertiary link, (c) naming paths in said switching network associated with said first and second intermediate matrices in sequential order beginning at a primary outlet or tertiary inlet forming part of said blocked path and proceeding from one end of one path, at a primary outlet or tertiary inlet to another path beginning at the same primary outlet of tertiary inlet as the other end of said one path, until an unused primary outlet or tertiary inlet is identified;

(d) breaking a selected one of said named paths and making said blocked path;

(e) breaking another of said named paths and rearranging paths named prior to said another path to use, in each instance, an intermediate matrix other than the one previously used, to free links from intermediate matrices to primary outlets or tertiary inlets;

(f) making a connection through said primary, intermediate and tertiary stages for one or another of said paths broken in steps (d) or (e); and (g) repeating said steps (d) and (e) until all broken connections are made.

In accordance with a more particular aspect of the invention, particularly adapted for the handling of digital information which is not tolerant of switching disturbances or transients, the method of the invention comprises, a method such as is recited above, in which said blocking switching network includes at least two buses selectively interconnecting primary and tertiary stages and, in whcih said method comprises the further steps of:

(di) providing, over one of said buses, an alternate path for said selected path, prior to effecting said step (d); and (ei) providing, over any available one of said buses, an alternate path for said another of said named paths, prior to effecting said step (e).

In accordance with a still more specific aspect, the invention includes the steps of:

(ci) continually checking the length of said path naming sequence and terminating said sequence if said length exceeds a predetermined length, and (cii) effecting an alternate naming sequence beginning at a primary outlet or tertiary inlet different from the one used in said step (c).

BRIEF DESCRIPTION OF THE DRAWINGS

The invention will be more particularly described so as to enable those skilled in the art to practice the same, in the following portions of the specification, when taken in conjunction with the attached drawings in which like reference characters identify identical apparatus and in which:

FIGS. 3a–3d are respectively a block diagram of a typical switching network, a table constructed in a machine implemented process in accordance with the invention, and flow charts depicting the several process steps.

DETAILED DESCRIPTION OF PREFERRED EMBODIMENTS

Figure 1A:
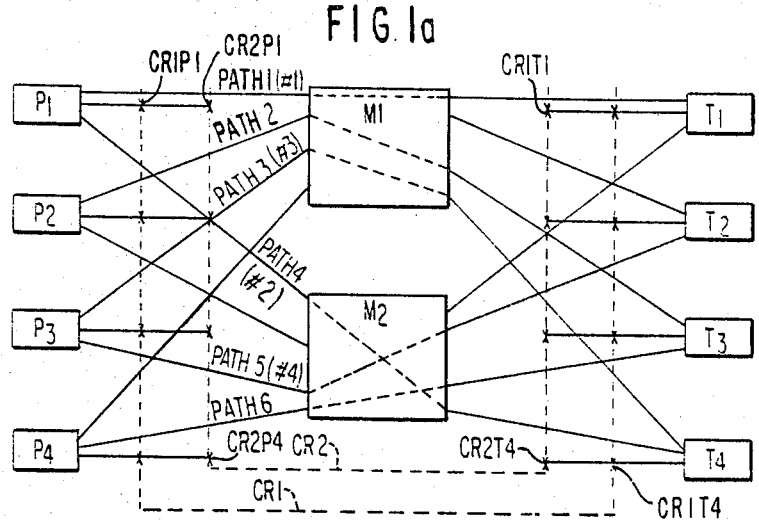
FIGS. 1a–1g illustrate exemplary matrices of a generalized three-stage switching network, including call rearranging busses CR1 and CR2, the different figures illustrate the progress of path rearrangement in accordance with one embodiment of the invention to effect a path (P4-T1) which is blocked in the initial (FIG. 1a) configuration.

FIG. 1a illustrates a typical blocking switching network with primary, intermediate and tertiary stages. As is shown in FIG. 1a, the primary stage is made up of a plurality, such as 4, primary matrices (the inputs to the primary stage matrices P1–P4 are not shown). Each primary stage matrix has a different outlet for each intermediate stage martrix. As shown in FIG. 1a the intermediate stage comprises a plurality of matrices of which two matrices, M1 and M2, are shown. Accordingly, each intermediate stage matrix M1 or M2 has an inlet from each primary matrix. Each intermediate stage matrix M1 and M2 has an equal number of inlets and outlets. Furthermore, the tertiary stage includes a number of matrices equal to the number of matrices in the primary stage, i.e. matrices T1–T4. As a result, each intermediate stage matrix M1 or M2 has a different outlet connected to each tertiary stage matrix (the outlets for the tertiary stage matrices are not illustrated). While FIG. 1a shows only two intermediate matrices, those skilled in the art will understand after reading the application that the invention is applicable to networks with many intermediate matrices.

More particularly, regardless of the size of a three-stage switching network, the rearranging effort to complete a connection, or make a desired path, centers on only two intermediate matrices. The desired path has fixed end points, selected primary and tertiary matrices. Each middle matrix has only a single link to each primary and tertiary. If network capacity is not exceeded, there must be a middle matrix with a free link to the desired primary and a middle matrix with a free link to the desired tertiary. Blocking occurs because the matrix with the free primary link is not the matrix with the free tertiary link, and vice versa. The object of the rearranging exercise is to transfer paths among these two middle matrices (and no others) until one of them has both free links. Since the process focuses on only two intermediate matrices, the drawings herein are, in fact, completely general.

Each primary or tertiary matrix has an equal number of inlets and outlets and thus no blocking can occur in a primary or tertiary stage. Blocking occurs at an intermediate matrix where, for example, the intermediate matrix has an inlet available for a requested path, but no available outlet to the required tertiary, or conversely the desired path is available from the intermediate to the tertiary, but is blocked because there is no available path from the primary matrix to the particular intermediate matrix. For purposes of this description, a path is considered to extend from a primary to a tertiary; since the switching network shown in FIG. 1a and 3 stages, each path includes two links, a link being that portion of a path extending between stages and thus for a three-stage network, two links are required, a first from a primary to an intermediate and a second from an intermediate to a tertiary. It should be apparent that the invention can be applied to networks with more than three stages by simple extrapolation.

For reasons which will appear hereinafter, the switching network shown in FIG. 1a also includes a pair of call rearranging buses CR1 and CR2 which selectively interconnect primary and tertiary matrices.

The particular technology employed in any one matrix is any conventional technology such as FET cross-point switches. To provide for the selective interconnection between the call rearranging buses and the primary and tertiary matrices, call rearranging switches, which may also comprise FET switches CR1P1-CR2T4 are provided. Switches CR1XX are switches connected to call rearranging bus CR1 and switches CR2XX are switches connecting to call rearranging bus CR2. Accordingly, to make or provide a path from primary P1 to tertiary T4, CR1P1 and CR1T4 are closed or CR2P1 and CR2T4 are closed.

To describe the problems sought to be solved we will assume that the switching network to FIG. 1a is carrying digital (not digitized voice) data and at one time provides for six paths, labelled path 1 through path 6 in FIG. 1a. Under these conditions it is desired to provide a path 7 from P4 to T1. Inspection of FIG. 1a reveals that intermediate matrix M2 has an available link to T1; however, it has no available link to P4, and on the other hand whereas intermediate matrix M1 has a free link to P4, it does not have a free link to T1. Accordingly, in the configuration of FIG. 1a, the path 7 (P4-T1) is blocked. To make path 7, it is therefore necessary to rearrange some of paths 1-6 so that they use intermediate matrices different from the ones shown in FIG. 1a, to thereby free up one of the intermediate matrices M1 or M2 with both a free link to P4 and a free link to T1. Which of the intermediate matrices M1 or M2 is freed up is of no consequence. The prior description made clear that M1 and M2 are selected since they have appropriate free links. The other middle matrices of the network (if any) play no part in the call rearranging.

Since rearranging requires breaking and making connections, and since we have assumed that the data travelling over the paths is sensitive to switching disturbances or transients, we will use the call rearranging buses CR1 and CR2 to make an alternate path for a path which is to be broken, and provide that path before the original path is broken.

Figure 1B:
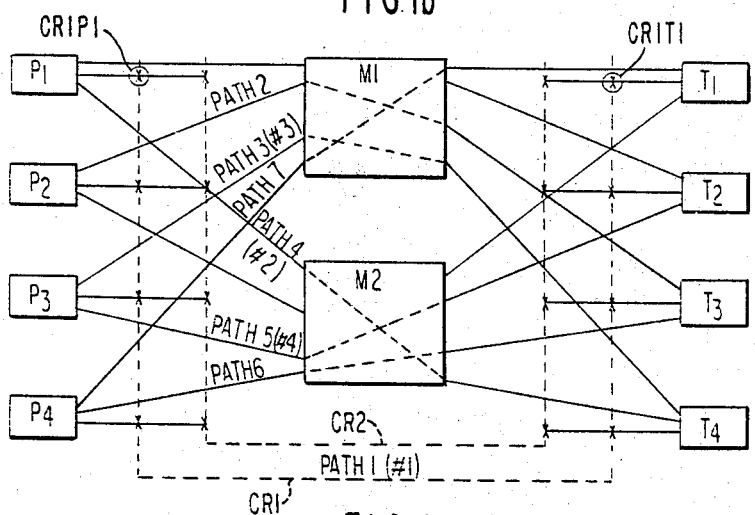

The switching sequence in which the rearrangement takes place will now be explained. The first step places the switching network in a condition as shown in FIG. 1b. As shown in FIG. 1b, path 1 which had previously traversed intermediate matrix M1 is now placed on the call rearranging bus CR1. In more detail, while path 1 uses M1 (that is before any switches are opened), the switches CR1P1 and CR1T1 are closed. Now path 1 exists simultaneously through M1 and CR1. Thereafter, the path is disconnected from M1 by operating switches in P1, M1 and/or T1. This frees up the outlet of M1 to tertiary T1 so that now we can make the connection for path 7, from P4 to T1 through M1, as is shown in FIG. 1b.

Figure 1C:
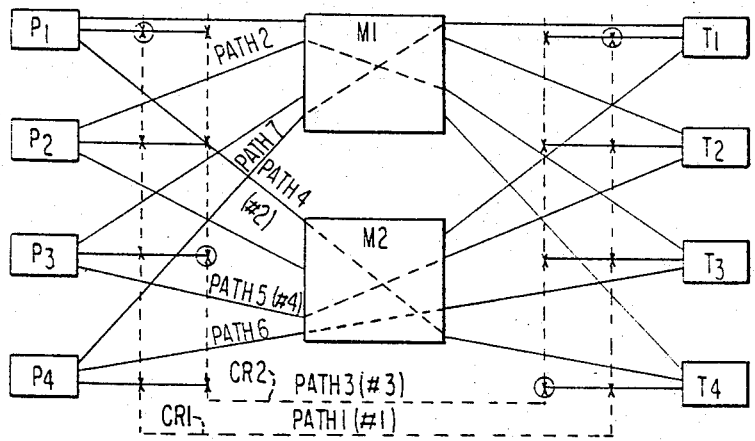

The next step in the sequence is shown in FIG. 1c where path 3, which had previously employed intermediate matrix M1, is now placed on call rearranging bus CR2. This is effected in a manner similar to the movement of path 1 from M1 to CR1.

Figure 1D:
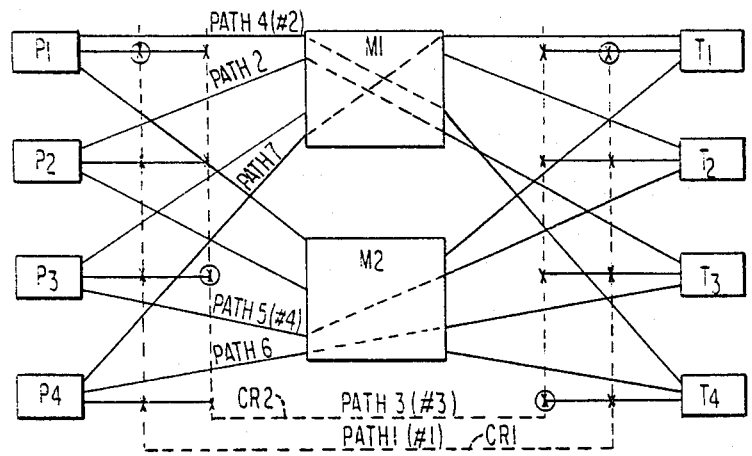

Subsequent to the step taken shown in FIG. 1c, path 4 is rearranged so that it now uses intermediate matrix M1 rather than the previously used intermediate matrix M2. Path 4 is moved (rearranged) in a manner identical to the movement of paths 1 and 3, that is the alternate path (through M1) is set up before the path through M2 is broken. Thus as shown in FIG. 1d, path 4 has been moved to traverse M1 rather than M2.

Figure 1E:
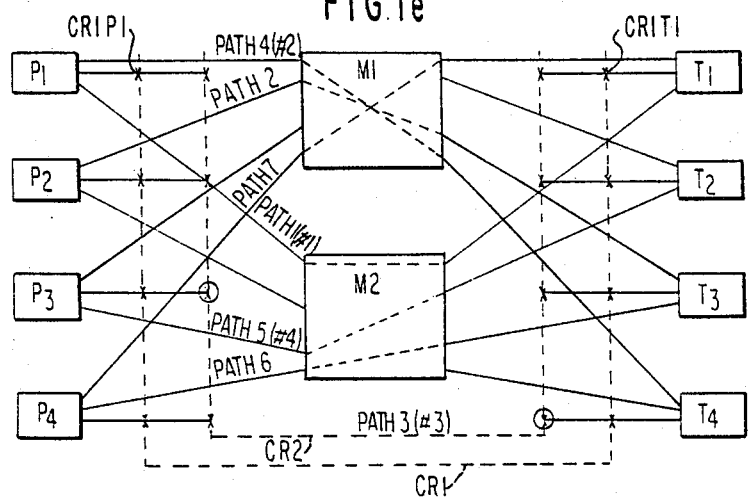

At this time, intermediate stage M2 now has a free link to both P1 and T1 such that path 1, having been switched to call rearranging bus CR1, can now be switched back to use intermediate matrix M2. This is effected by first preparing P1, M2 and T1 to provide the path and then opening CR1P1 and CR1T1. Thus as shown in FIG. 1e, call rearranging bus 1 is freed up by moving path 1 to use intermediate matrix M2.

Figure 1F:
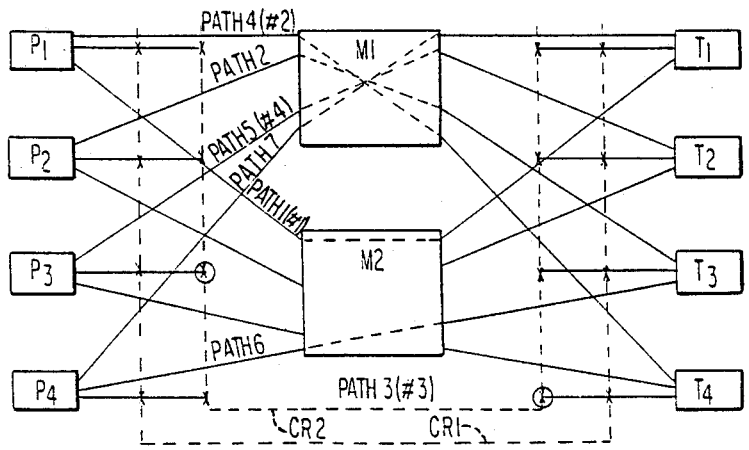
Figure 1G:
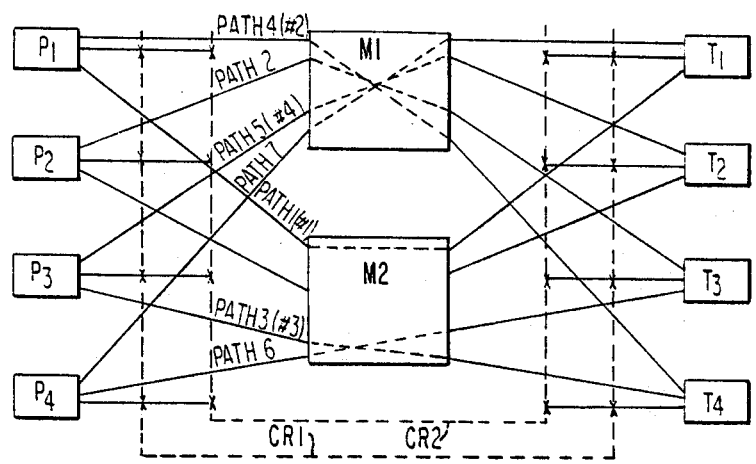

The next step takes the switching network to the condition shown in FIG. 1f. To effect this step, path 5 is moved from intermediate matrix M2 to intermediate matrix M1. Because path 5 can be made through M1 (instead of M2) this rearranging requires only preparing the M1 switches and then effecting the transfer (by opening the path 5 M2 related switches). In the conditions shown in FIG. 1f now, path 3 which is carried by call rearranging bus CR2 can also be carried via M2 since there is a free link to M2 from primary P3 and tertiary T4. Accordingly, the last step in the method frees up the call rearranging bus CR2 by making the path traverse the intermediate matrix M2. The result of the rearranging is shown in FIG. 1g wherein paths 1 through 7 are all made through the intermediate matrices M1 and M2, and both call rearranging buses CR1 and CR2 are again free.

The key to effecting the sequence just described is rearranging paths in an ordered manner. To effect this path rearrangement a table is constructed to identify the paths to be rearranged. Table I reproduced below represents the initial paths through the switching network as represented in FIG. 1a.

TABLE I

|    | P1  | P2  | P3  | P4  | T1  | T2  | T3  | T4  |
|----|-----|-----|-----|-----|-----|-----|-----|-----|
| M1 | PA1 | PA2 | PA3 | —   | PA1 | —   | PA2 | PA3 |
| M2 | PA4 | —   | PA5 | PA6 | —   | PA5 | PA6 | PA4 |

The table includes a column for each primary or tertiary matrix P1-T4 and a row for each different intermediate matrix M1 and M2. The intersection of row and column carries an identification of the particular path or a dash indicating a free link. For example, the intersection of the P1 column and the M1 row shows "PA1" identifying path 1; the same entry is made in the T1 column for intermediate matrix M1 indicating that the path from T1 through P1 (path 1 or PA1) uses intermediate matrix M1. In order to name the paths for rearrangement we start at a primary outlet or tertiary inlet which is part of the path which is blocked. The path which is blocked, in our example is P4 to T1 and so we start at the tertiary inlet T1. Beginning at T1, thus, we name the path #1 as T1 through M1 to P1. We continue naming paths, continuing at the primary or tertiary at the other end of #1. Thus, the path 4 (P1-T4) is named #2. The next path (path 3) extending from T4 through P3 is named #3. Path 5 (from P3 through T2) is named #4. At this point, the naming terminates since the link to T2 represents an unused (or free) tertiary inlet. The table is now as shown in Table II below wherein the links for PA2 and PA6 have not been used and paths #1 through #4, are now renamed.

TABLE II

|    | P1 | P2  | P3 | P4  | T1 | T2 | T3  | T4 |
|----|----|-----|----|-----|----|----|-----|----|
| M1 | #1 | PA2 | #3 | —   | #1 | —  | PA2 | #3 |
| M2 | #2 | —   | #4 | PA6 | —  | #4 | PA6 | #2 |

Note that Table II could have been constructed from the condition of the network, i.e. Table I is not necessary to practicing the invention. In an embodiment of the invention there is nothing corresponding to Table I. Each time rearranging is to be effected, a Table II is constructed.

Once the paths are named we can now do the rearranging, the first step is to move #1 to a call rearranging bus, CR1. Since we began with the blocked tertiary T1, this rearrangement leaves links free to make the desired P4-T1 path and thus the next step is to establish a new path, the desired path P4-T1, and that is the condition shown in FIG. 1b.

We now move #3 to call rearranging bus CR2, and this is the condition shown in FIG. 1c. This frees up links to intermediate matrix M1 and this allows us to transfer #2 from M2 to M1; following that step the condition of the network is shown in FIG. 1d. This move now frees up links to intermediate matrix M2 and thus we can move #1 to M2 to free up the call rearranging bus CR1; this condition is illustrated in FIG. 1e. The sequence begun is continued, moving paths from one intermediate matrix to another in an ordered sequence. In general (that is on the nth step), we move # $(2n+1)$ to an available call rearranging bus. Then we move # $(2n)$ from one intermediate matrix to the other. This allows us to move # $(2n-1)$ from one or the other of the call rearranging buses to a now available intermediate matrix, M2. On the last step we perform the same three steps except that we omit step 1 if the last path is even, and omit steps 1 and 2 if the last path is odd. The last step leaves both path rearranging buses CR1 and CR2 free.

The same effect could have been obtained, using the same sequence, established by Table II, and placing the previously blocked path (P4-T1) through M2 rather than M1.

Figure 2B:
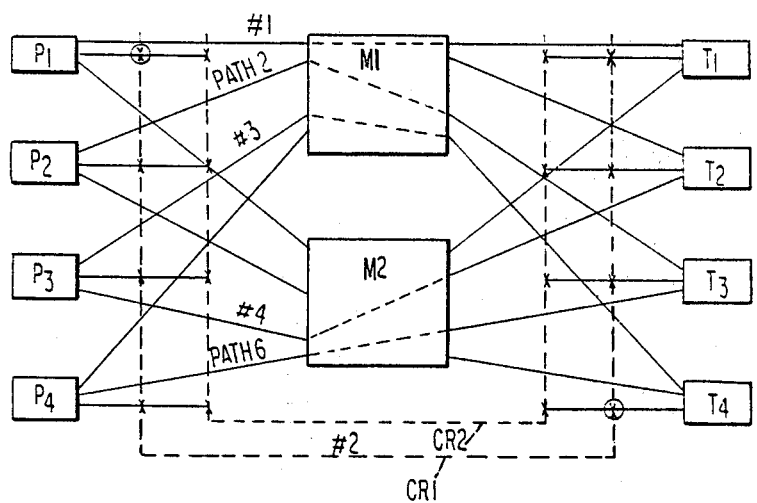
FIGS. 2b–2d, when associated with FIG. 1a, illustrate the progress of path rearrangement in accordance with a second embodiment of the invention.
Figure 2C:
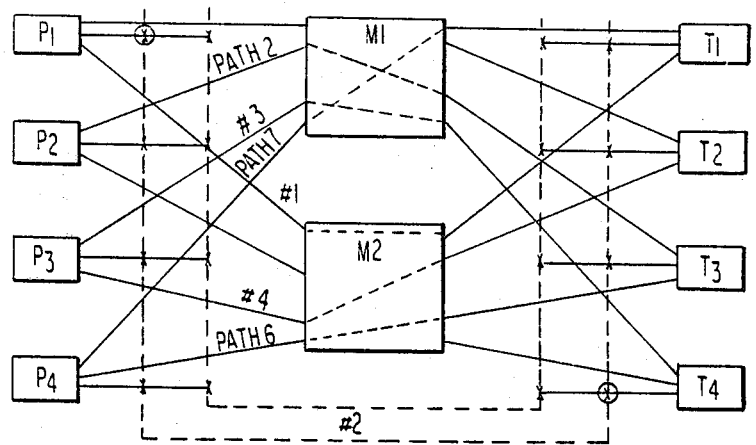

As a still further alternative, but using the same sequence shown in Table II, rather than beginning with #1, we begin with #2. This path is made to one of the available rearranging buses (for example CR1) and the path through matrix M2 is broken. (See FIG. 2b.) Thereafter, #1 is transferred from matrix M1 to matrix M2, thus freeing up links through matrix M1 for the desired connection; and this connection (P4-T1) can now be made through M. (See FIG. 2c.)

The following steps follow a sequence wherein, on the nth iteration;

$(n+1)$ is transferred to a free bus; this step is skipped if the last path is n—that is the rearrangement has been completed. On the second step of this iteration # (n) is transferred from a call rearranging bus to stage M1 (if n is even) or to M2 (if n is odd).

Figure 2D:
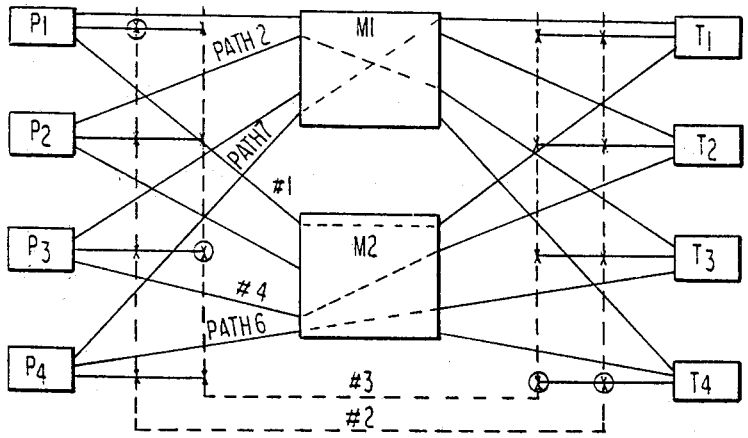

This particular sequence has a disadvantage in that, the first step of the first iteration transfers #2 (P1-T4) to CR1, and the first step of the nth iteration transfers #3 (P3-T4) to CR2, see FIG. 2d. Thus, to make these connections, each call rearranging bus requires a separate connection to each tertiary (and likewise to each primary). This of course requires additional switching capacity which is not required for the rearranging sequence of FIGS. 1a-1g.

PROOF OF CALL REARRANGING BOUND

There is an upper limit on the amount of rearranging that is required, and, depending on the number of free links, there is an optimum rearranging sequence which requires a minimum number of path rearranging steps.

To prove this statement, assume that a three stage switching network has two secondary matrices, (as described above, this is no limit to the generality of the proof) one with a free link to a tertiary and the other with a free link to a primary. Since secondary matrix links come in pairs (each primary link can be paired with a tertiary link), it follows that each secondary matrix has at least two free links, one to a tertiary, the other to a primary. Let's identify a secondary matrix 1 and a secondary matrix 2. We can therefore in general refer to:

a(i) as a tertiary link for secondary 1;
b(i) as a primary link for secondary 1;
c(i) as a tertiary link for secondary 2;
d(i) as a primary link for secondary 2.

If we assume that each intermediate matrix has a link to each different primary stage and to each tertiary stage, then each of the characters a to d represent the link number; for example with 16 links per intermediate matrix, the characters a to d represent link numbers in the range 1-16. The index (i) is used to indicate the position of the link in the sequence below and so a(i) in one sequence is not (necessarily) the same as a(i) in another sequence. Since we have assumed there are four free links, two inlets and two outlets to each intermediate matrix, we will call these A, B, C, D.

Now consider the link sequences: C, a(1), b(1), d(2), c(2), a(3), b(3) ... d(n), c(n), A (sequence #1) or C, a(1), b(1), a(2), c(2), a(3), b(3) ... a(n), b(n), D (sequence #2). The first sequence represents finding a free link (A) from secondary 1 to a tertiary. The second sequence represents finding a free link (D) from secondary 2 to a primary. The sequences are derived uniquely as follows:

1: there is a path between a(i) and b(i) and between c(i) and d(i)
2: d(i+1)=b(i) and a(i+1)=c(i).

Statement 1 states that intermediate matrix inlets and outlets [a(i) and b(i) for secondary 1 and c(i) and d(i) for secondary 2] are connected. Statement 2 is to the effect that primaries and tertiaries have the same links connected to secondaries 1 and 2; that is primary link b(i) from secondary 1 occupies the same position as primary link d(i+1) from secondary 2.

The sequence begins with link C of the free tertiary for secondary matrix 2, and a(1) equals C. The sequence ends when a link is found such that A equals c(n) or D equals b(n).

Note that the two derivation rules define unique neighbors for each of the elements in the sequence. Accordingly, we cannot have x(j)=x(i), where x is any of a, b, c or d. To prove this, assume the opposite is true and consider the first occurrence of x(n)=x(k). Because each element has a unique predecessor, it must also have x(n−1)=x(k−1) which contradicts the assumption that x(n)=x(k) was the first occurrence of equality. Thus, if N is the total number of links per secondary matrix, the maximum length of the sequence including free links is 2N−2, since only two free links are present; because we began with a free link and specified our sequence to terminate at a second free link.

Now rather than beginning the sequence with C, consider the sequence beginning with B, the free primary link in secondary matrix 1. The next element is d(1)=B, and following elements are derived using the same rules as for the previous sequence. The uniqueness property of all elements in the sequence leads to the conclusion that the sequences cannot have two elements in common. The combined lengths of both sequences is at most 2 N, accordingly one sequence is at most N elements long, including at most N−2 non-free links. It follows that the maximum number of paths to rearrange is at most (n−2)/2 or N/2−1.

If path rearranging as described above is to be added to an existing switching network, the path rearranging device is activated by the switching network control if no path can be found between a free primary and a free tertiary. This device, using the network connection tables, determines the path rearranging sequence to provide a free path and transmits the sequence to the network control which then disconnects and reconnects the necessary paths.

On the other hand, and preferably, if the call rearranging method described above is to be provided in a new switching network, the function can easily be integrated into the network control itself.

While the invention can be implemented with many forms of switching (i.e. from relay logic controlled electromagnetic relays to microprocessor controlled semi-conductive switching integrated circuits), the invention has been implemented on the switching network showin in the co-pending application Ser. No. 298,705 filed Sept. 12, 1981, in the name of Melas et al and assigned to the assignee of this application. As described in that application, which is incorporated herein by reference, a Z80 microprocessor is used to respond to connection requests, determine appropriate switching actions, issue the appropriate controls to FET crosspoint switches and determines that a particular connection request is blocked. The same Z80 microprocessor, in accordance with the invention, determines an appropriate rearrangement sequence and issues the necessary controls to effect that rearrangement. The portion of the software used to write the path rearranging table, from which the sequence of rearranging is derived is shown in FIGS. 3c–3d.

Figures 3A, 3B:
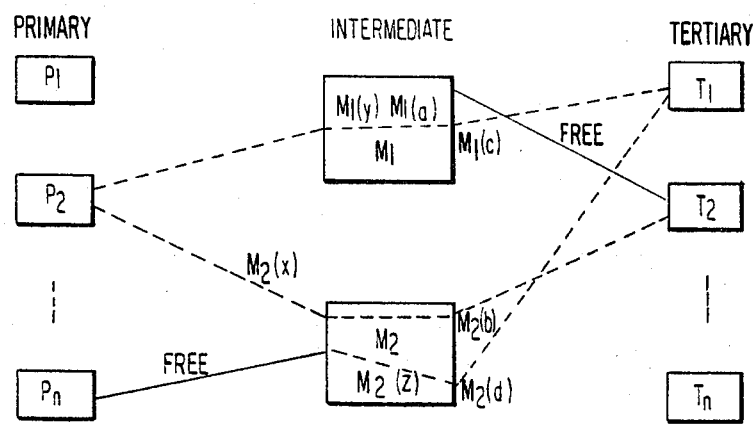

To explain that processing, reference is first made to FIG. 3a which illustrates the significant parts of a three-stage switching network including primary matrices $P_1$ to $P_n$, a plurality of intermediate matrices including $M_1$ and $M_2$, tertiary matrices $T_1$ to $T_n$. The connection $P_n$-$T_2$ is desired, but it is assumed blocked for purposes of this description. The links from $P_n$ to $M_2$ (x) and $T_2$ to $M_1$ (a) are the free links which, as explained, determine the identity of $M_1$ and $M_2$, from among all other intermediate matrices. Links in use are shown in FIG. 3a as dashed lines, free links are shown as solid, intermediate matrix input addresses are $M_{n(m)}$ where n is 1 or 2 and m is x, y, z, etc.; intermediate matrix outputs are $M_{n(m)}$ where n is 1 or 2 and m is a, b, c, etc.

In determining that a path is blocked, the network controller determines the identity of the free links to the desired primary ($P_n$) and tertiary ($T_2$). These links are connected, respectively, to secondaries $M_2$ and $M_1$; thus the secondaries whose paths are to be rearranged are identified by the free links. The processor then performs the steps shown in FIG. 3c, to build the PRTABLE (path rearranging table).

As shown in FIG. 3c, the sequence of steps is entered with the secondaries identified; the sequence shown in FIG. 3c begins at secondary $M_1$. Function F1 stores the addresses of the secondaries to be employed. Function F2 sets a pointer (IX) to the address at the beginning of PRTABLE. Function F3 obtains the address of the free link from $M_1$ (i.e. the free link to tertiary $T_2$). In the network of FIG. 3a, each matrix has N inputs and outputs, the first output of any primary is connected to the first intermediate matrix, the second output of any primary is connected to the second matrix, and so forth. In a like fashion, the first output of any intermediate matrix is connected to the first tertiary matrix, the second output of any intermediate matrix is connected to the secondary tertiary matrix, and so on. Accordingly, having identified the free link from $M_1$, the same information also identifies the tertiary matrix to which it is connected. Function F4 loads the address of the $M_1$ link as the first entry of PRTABLE. Function F5 determines if this link is free and it is not the first entry in the table. The sequence of steps shown in FIG. 3c is performed ina loop type fashion until a free link is determined to exist. Since the first entry in the table is always a free link, the function at F5 only checks to see if the second and subsequent entries in the table constitutes a free link. Accordingly, in this first pass through the loop the no exit to function F6 is followed. Function F6 traces the link from the tertiary to intermediate matrix $M_2$. Function F7 loads the address of this link in PRTABLE at the location three bytes beyond IX. After the portion of the table constructed by the functions shown in this figure and in FIG. 3d is completed, the table is filled out by adding addresses corresponding to the switches in the different primary and tertiary matrices with which the path is connected. These addresses are used to speed the rearranging process; at this point they can be ignored. However, since each path includes three bytes, each entry in the PRTABLE is three bytes long. As a result, function F7, to address the first byte of the second entry must increment the pointer by three. Function F8 determines if the link just identified is free. If function F6 is capable of tracing a link, then it is not free. If the trace is unsuccessful, then the link is identified as free. Assuming the link is not free, then function F9 traces the next path from the primary identified in the tracing function at F6 to obtain the $M_1$ link and therefore identify the tertiary for the next path. Function F10 increments the pointer by six. The reason for this will become clear shortly. Function F11 checks to see if the pointer exceeds a fixed quantity N. If it does, this indicates the table has grown to such an extent that it does not identify an optimum path rearranging sequence. Assuming, however, that the pointer does not exceed the fixed quantity, then the processing loops back to function F4 wherein the address obtained in function F9 is loaded in PRTABLE at the address defined by the pointer. This should make it clear why function F10 incremented the pointer by six, i.e. to put it three bytes beyond the address loaded in function F7. Thereafter, the functions F4 through F11 are repeated sequentially until either function F5 or function F8 determines that a link is free or function F11 determines that the table has grown beyond the threshold N.

If either function F5 or F8 identifies a free link, then the sequence is completed, the processing skips to function F12 where a flag is set and a return made to the main program. Similarly, if function F11 identifies that the table has grown too large, a return is made to the main program at the same point, however the flag is not set.

In the portion of the program returned to, the flag set at function F12 is checked; if it is set, it indicates that a successful table building operation has been completed. If the flag is not set, it indicates that table building was not successful and the main program then skips processing to function F14 (see FIG. 3d). Function F14 is similar to function F1. Function F15 obtains the address of the free link from $M_2$. Function F16 sets the pointer to the beginning of PRTABLE less three bytes. The processing then skips to point A, function F7. Function F7 in loading the address determined at function F15 at the pointer IX plus three, in effect loads this address at the first entry in the table. Thereafter, the functions previously described are performed. Note, that in executing functions F14–F16, the PRTABLE begins at a primary in contrast to the table built beginning at functions F3 et seq., which results in a table beginning at a tertiary.

When the table is completed, the actual switching for call rearranging is relatively simple. The path defined by the first entry (primary $P_2$ through intermediate $M_2$ to tertiary $T_2$) is broken and the desired path can then be made through $M_2$ using the already identified free link from $P_n$ to $M_2$ with the free up link from $M_2$ to $T_2$. Prior to breaking the path, of course, call rearranging switches must be set up to provide an alternative path for $P_2$ to $T_2$, but with the information in PRTABLE, identifying the switches that must be thrown is relatively simple.

Once the desired path is made and the first path has been shifted to one of the call rearranging buses, then the next path in the table is moved to the other call rearranging bus, and the path on the first call rearranging bus is moved to the other intermediate. This process continues bumping paths from one intermediate to another until the other free link is identified which enables the path on the call rearranging bus to be switched back to the intermediate associated with the free link.

Table III (reproduced below) is an actual program listing of a Z80 program to construct the path rearranging table. The table shows, in the first column, the line number for the program statement; in a second column certain segments of the program are identified; the third column identifies the instruction type; and the last column or columns comprises addresses or other parameters used with the instruction on the same line.

TABLE III

| Line # | | Instr. | |
|---|---|---|---|
| 0 | PPROC | CALL | PPARM |
| 1 | | CALL | PSEQ1 |
| 2 | | JPC | Z, PCALL |
| 3 | PSEQJ | CALL | PSEQ2 |
| 4 | | RNZ | |
| 5 | PCALL | CALL | ATQCLR |
| 6 | | CALL | PATH |
| 7 | | CALL | REVSET |
| 8 | | CALL | PATH |
| 9 | | RET | |
| 10 | PPARM | LD | A, D |
| 11 | | XOR | E |
| 12 | | ANDIM | X '00000011' |
| 13 | | JPC | Z, PBC |
| 14 | | LDM | A, (NBRD) |
| 15 | | SET | 6, A |
| 16 | | LDM | (NBRD), A |
| 17 | PBC | LDIM# | IY, NETPARM |
| 18 | | LD | A, D |
| 19 | | CALL | LKADR |
| 20 | | LDM | (TSLA), A |
| 21 | | LD | A, E |
| 22 | | CALL | LKADR |
| 23 | | LDM | (PSLA), A |
| 24 | | INC | A |
| 25 | | RET | |
| 26 | BRET | XOR | A |
| 27 | | RET | |
| 28 | LKADDR | RRCA | |
| 29 | | RRCA | |
| 30 | | ANDIM | B '00001111' |
| 31 | | RET | |

TABLE III-continued

| Line # | | Instr. | |
|---|---|---|---|
| 32 | PSEQ1 | LDMP | (SECADDR), DE |
| 33 | | LDIM# | IX, PRTABL |
| 34 | | LD | A, B |
| 35 | | LD | B, D |
| 36 | | CALL | ADRTOLET |
| 37 | | LD | X, A |
| 38 | SEQLOOP | LD@ | (IX + 0), L |
| 39 | | BIT | 6, L |
| 40 | | JPC | NZ, PSRETR |
| 41 | | CALL | SET, S1 |
| 42 | | LD | B, D |
| 43 | | CALL | TROS |
| 44 | | SET | 5, H |
| 45 | | LD@ | (IX + 3), H |
| 46 | | BIT | 6, H |
| 47 | | JPC | NZ, PSRETR |
| 48 | | CALL | SET S0 |
| 49 | | LD | B, E |
| 50 | | CALL | TRIS |
| 51 | | LDIP | BC, 6 |
| 52 | | ADD# | IX, BC |
| 53 | | BIT@ | 7, (IX + 0) |
| 54 | | RNZ | |
| 55 | | JP | SEQLOOP |
| 56 | PSRETR | XOR | A |
| 57 | | RET | |
| 58 | PSEQ2 | LDM | HL, (TRMADDR) |
| 59 | | LDMP | DE, (SECADDR) |
| 60 | | LD | A, H |
| 61 | | LD | B, E |
| 62 | | CALL | ADRTOLET |
| 63 | | LD | H, A |
| 64 | | LDIM# | IX, PRTABL-3 |
| 65 | | JP | SQL2 |

The main program comprises lines 0–9, the remaining steps are sub-routines called from the main program. The main program is called when a connection is requested which is blocked.

The first step in the program (line 0) calls a sub-routine PPARM, located at lines 10–27. On entering the program the inlet addresses in the H register, the outlet address is in the L register and a chip address is in a B register. The program shown in Table III was written for a machine in which the chips comprising the matrices were distributed on two boards, therefore a certain amount of address translation was required if the program was operating with chips on both boards. In terms of the program parameters, TSEC is the address of the intermediate with a free link to a tertiary, contained in the D register, and PSEC is the address of the intermediate with a free link to a primary, located in the E register. The new path is identified by a tertiary address (TRMADDR) in a register HL and a primary address (PRTADDR) in a register BC. The parameter NBRD is a 1 for a one board machine and a 2 for a two board machine.

The sub-routine PPARM determines (in line 13) if PSEC and TSEC are on the same or different boards. If they are on different boards then the parameter NBRD is set to 2, otherwise lines 14–16 are skipped by the jump command and line 13.

Lines 17–25 determine the link addresses where the primary and tertiary links connected to PSEC and TSEC. The sub-routing LKADR (referred to in lines 19 and 22) derives from SECADDR, a link address. The derivation is obtained via a masking operation; the sub-routine is shown in lines 28–31 and the masking operation is shown in line 30.

With the link addresses derived, the next step in the program calls PSEQ1; see line 32 et seq. The flow chart of FIG. 3c (function F1) begins at line 32. The loop of FIG. 3c extends from line 32 through line 55. The test (function F5 of FIG. 3c) is shown in line 40, the test F8 is line 47 and the test F11 is line 55. In the event that the test F11 is failed, then the return to the main program is such so that the conditional jump (of line 2) is not performed and thereafter line 3 calls PSEQ2. Accordingly, lines 58-65 of Table III correspond to FIG. 3d. If test F11 is not failed the routine PATH is called to rearrange all the links in the PRTABLE.

In an embodiment of the invention which has been operated, the switching network in which path rearranging was effected connected computer terminals and controller ports. Since these connections carry bidirectional requirements, each terminal and port was connected at both a primary inlet and tertiary outlet. Since a set of forward paths (terminals to ports) was always associated with a mirror image path (ports to terminals), the table, once constructed for forward paths was used to rearrange the reverse paths as well.

Having thus described my invention, what I claim as new, and desire to secure by Letters Patent is:

1. A method of rearranging paths in a blocking switching network, said blocking switching network comprising at least primary, intermediate and tertiary stages, with at least two intermediate switching matrices in said intermediate stage, each said intermediate switching matrix with a number of inlets and outlets less than the total number of inlets of primary stage matrices or the total number of outlets of tertiary stage matrices, comprising the steps of:
   (a) detecting a connection request for a path which is blocked;
   (b) identifying a first intermediate matrix with an appropriate free primary link and a second intermediate matrix with an appropriate free tertiary link;
   (c) naming paths, for rearrangement in said switching network associated with said first and second intermediate matrices, in sequential order beginning at a primary outlet or tertiary inlet forming part of said blocked path and proceeding from one end of one path at a primary outlet or a tertiary inlet to another path beginning at the same primary outlet or tertiary inlet at the other end of said one path until an unused primary outlet or tertiary inlet is identified;
   (d) breaking a selected one of said named paths and making said blocked path;
   (e) breaking another of said named paths and rearranging selected paths named prior to said another path to use an intermediate matrix other than the one previously used to free links from intermediate matrices to primary outlets or tertiary inlets;
   (f) making a connection through said primary, intermediate and tertiary stages for one or another of said paths broken in steps (d) or (e);
   (g) repeating said steps (e) and (f) until all broken connections are made.

2. The method of claim 1, in which said blocking switching network includes at least two buses selectively interconnecting prmary and tertiary stages and, in which said method comprises the further steps of:
   (di) providing, over one of the said buses, an alternate path for said selected path, prior to effecting said step (d);
   (ei) providing, over any available one of said buses, an alternate path for said another of said named paths prior to said step (e).

3. The method of claims 1 or 2 in which said selected path is the first path named at said primary outlet or tertiary inlet forming part of said blocked path.

4. The method of claims 1 or 2 which includes the additional steps of:
   (ci) continually checking the length of said path naming sequence and terminating said sequence if said length exceeds a predetermined length, and
   (cii) effecting an alternate naming sequence beginning at a primary outlet or tertiary inlet different from the one used in said step (c).

* * * * *